US012580740B2

(12) United States Patent
Venkatesan et al.

(10) Patent No.: US 12,580,740 B2
(45) Date of Patent: Mar. 17, 2026

(54) ACCESS CONTROL USING MEDIATED LOCATION, ATTRIBUTE, POLICY, AND PURPOSE VERIFICATION

(71) Applicant: Microsoft Technology Licensing, LLC, Redmond, WA (US)

(72) Inventors: Ramarathnam Venkatesan, Redmond, WA (US); Nishanth Chandran, Bangalore (IN); Ganesh Ananthanarayanan, Sammamish, WA (US); Panagiotis Antonopoulos, Redmond, WA (US); Srinath T. V. Setty, Redmond, WA (US); Daniel John Carroll, Jr., Columbia, MD (US); Kiran Muthabatulla, Sammamish, WA (US); Yuanchao Shu, Kirkland, WA (US); Sanjeev Mehrotra, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 246 days.

(21) Appl. No.: 18/045,335

(22) Filed: Oct. 10, 2022

(65) Prior Publication Data

US 2024/0121081 A1 Apr. 11, 2024

(51) Int. Cl.
*H04L 29/06* (2006.01)
*H04L 9/08* (2006.01)
(52) U.S. Cl.
CPC ............ *H04L 9/0825* (2013.01); *H04L 9/085* (2013.01); *H04L 9/0866* (2013.01)
(58) Field of Classification Search
CPC ..... H04L 9/0825; H04L 9/085; H04L 9/0866; H04L 9/50; H04L 63/08; H04L 63/10; H04L 63/0428; G06F 21/64
See application file for complete search history.

(56) References Cited

U.S. PATENT DOCUMENTS

| | | | |
|---|---|---|---|
| 8,601,549 B2 | 12/2013 | Dickerson | |
| 9,547,771 B2 | 1/2017 | Roth | |

(Continued)

FOREIGN PATENT DOCUMENTS

| | | |
|---|---|---|
| CN | 110363528 A | 10/2019 |
| CN | 114221764 A | 3/2022 |
| JP | 2022020557 A | 2/2022 |

OTHER PUBLICATIONS

Non-Final Office Action mailed on Sep. 6, 2024, in U.S. Appl. No. 17/937,098, 18 pages.

(Continued)

*Primary Examiner* — Yogesh Paliwal
(74) *Attorney, Agent, or Firm* — Weaver IP L.L.C.

(57) ABSTRACT

An access control system is disclosed for controlling access to a resource. A request is received by a location attribute policy (LAP) server to access an encrypted resource. The LAP server accesses a resource policy that identifies requirements for granting access to the encrypted resource, such as a list of attributes of the requestor that are required and a dynamic attribute requirement of the requestor. The LAP server receives a cryptographic proof from the computing device that the requestor possesses the attributes and validates the proof based at least on information obtained from a trusted ledger. Once the proof is validated, the LAP server provides a shared secret associated with the dynamic attribute requirement to a decryption algorithm. The decryption algorithm uses the dynamic attribute shared secret in combination with one or more attribute shared secrets from the requestor to generate a decryption key for the encrypted resource.

20 Claims, 5 Drawing Sheets

(56) References Cited

U.S. PATENT DOCUMENTS

| | | | |
|---|---|---|---|
| 10,211,977 B1 | 2/2019 | Roth | |
| 10,637,855 B2 | 4/2020 | Mikulski | |
| 10,990,689 B1 | 4/2021 | Reiner | |
| 11,036,869 B2 | 6/2021 | Roth | |
| 11,139,954 B2 | 10/2021 | Mercuri | |
| 11,424,920 B2 | 8/2022 | Bursell et al. | |
| 11,544,409 B2 | 1/2023 | Brannon | |
| 11,593,316 B2 | 2/2023 | Haldar | |
| 11,695,555 B2 | 7/2023 | Roth | |
| 11,799,630 B2 | 10/2023 | Zhang | |
| 11,886,574 B2 | 1/2024 | Bursell et al. | |
| 12,058,265 B2 | 8/2024 | Khoury | |
| 12,107,900 B2 | 10/2024 | Gargaro | |
| 2002/0023213 A1 | 2/2002 | Walker | |
| 2002/0138738 A1 | 9/2002 | Sames | |
| 2007/0055867 A1 | 3/2007 | Kanungo et al. | |
| 2012/0060207 A1 | 3/2012 | Mardikar et al. | |
| 2013/0145151 A1 | 6/2013 | Brown | |
| 2015/0089575 A1 | 3/2015 | Vepa | |
| 2015/0288669 A1 | 10/2015 | Litoiu | |
| 2015/0381575 A1 | 12/2015 | Bhargav-spantzel et al. | |
| 2017/0041148 A1 | 2/2017 | Pearce | |
| 2017/0111175 A1* | 4/2017 | Oberhauser | G06Q 20/4014 |
| 2019/0020485 A1 | 1/2019 | Uhr | |
| 2019/0163912 A1 | 5/2019 | Kumar | |
| 2019/0258811 A1 | 8/2019 | Ferraiolo | |
| 2019/0370358 A1 | 12/2019 | Nation | |
| 2019/0394175 A1 | 12/2019 | Zhang | |
| 2020/0014537 A1 | 1/2020 | Ortiz | |
| 2020/0082401 A1* | 3/2020 | Arora | G06Q 20/382 |
| 2020/0322342 A1 | 10/2020 | Gokhale | |
| 2020/0374105 A1 | 11/2020 | Padmanabhan | |
| 2020/0396222 A1 | 12/2020 | Gargaro et al. | |
| 2020/0404023 A1* | 12/2020 | Zhu | H04L 63/20 |
| 2021/0089676 A1 | 3/2021 | Ford | |
| 2021/0092607 A1 | 3/2021 | Klinkner | |
| 2021/0218742 A1 | 7/2021 | Cook | |
| 2021/0232707 A1 | 7/2021 | Wilson | |
| 2021/0233673 A1 | 7/2021 | Zhang | |
| 2021/0273931 A1* | 9/2021 | Murdoch | H04L 9/3239 |
| 2021/0279355 A1* | 9/2021 | Otte | G06F 21/6218 |
| 2021/0303714 A1 | 9/2021 | Yaghoobi | |
| 2021/0367778 A1 | 11/2021 | Hamel | |
| 2021/0377037 A1 | 12/2021 | Antonopoulos et al. | |
| 2022/0020003 A1 | 1/2022 | Sarkar | |
| 2022/0021711 A1 | 1/2022 | Marsh | |
| 2022/0138181 A1 | 5/2022 | Irazabal | |
| 2022/0188810 A1 | 6/2022 | Doney | |
| 2022/0269927 A1 | 8/2022 | Rice | |
| 2022/0271936 A1 | 8/2022 | Doney | |
| 2022/0292211 A1 | 9/2022 | Reineke | |
| 2022/0400020 A1 | 12/2022 | Davies | |
| 2022/0417254 A1 | 12/2022 | Michaelis | |
| 2023/0015569 A1 | 1/2023 | Davies | |
| 2023/0035317 A1 | 2/2023 | Jufer | |
| 2023/0336547 A1 | 10/2023 | Damour | |
| 2023/0379699 A1 | 11/2023 | Oerton | |
| 2023/0388348 A1 | 11/2023 | Authement | |
| 2024/0056424 A1 | 2/2024 | Venkatesan | |
| 2024/0089098 A1 | 3/2024 | Venkatesan | |
| 2024/0104229 A1 | 3/2024 | Venkatesan | |
| 2024/0114012 A1 | 4/2024 | Venkatesan | |
| 2024/0119168 A1 | 4/2024 | Venkatesan | |

OTHER PUBLICATIONS

Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.

International Search Report and Written Opinion received for PCT Application No. PCT/US2023/031022, mailed on Dec. 11, 2023, 16 pages.

Mounnan, et al., "Efficient Distributed Access Control Using Blockchain for Big Data in Clouds", International Conference on Wireless and Mobile Communications (ICWMC), Jun. 30, 2019, pp. 53-62.

International Search Report and Written Opinion received for PCT Application No. PCT/US23/030988, mailed on Nov. 30, 2023, 13 pages.

"Application as Filed in U.S. Appl. No. 17/819,030", filed Aug. 11, 2022, 57 Pages.

Non-Final Office Action mailed on Oct. 18, 2024, in U.S. Appl. No. 17/934,730, 25 pages.

International Search Report and Written Opinion received for PCT Application No. PCT/US23/031471, Nov. 14, 2023, 18 pages.

Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.

Notice of Allowance mailed on Mar. 14, 2025, in U.S. Appl. No. 17/937,098, 12 pages.

International Preliminary Report On Patentability received for PCT Application No. PCT/US23/030988, Apr. 3, 2025, 08 pages.

Antonopoulos, et al., "SQL Ledger: Cryptographically Verifiable Data in Azure SQL Database", In Proceedings of the International Conference on Management of Data, Jun. 20, 2021, pp. 2437-2449.

Final Office Action mailed on Apr. 24, 2025, in U.S. Appl. No. 17/934,730, 27 pages.

International Preliminary Report on Patentability received for PCT Application No. PCT/US23/031022, mailed on Apr. 10, 2025, 09 pages.

International Preliminary Report on Patentability received for PCT Application No. PCT/US23/031471, mailed on Apr. 24, 2025, 14 pages.

Notice of Allowance mailed on May 19, 2025, in U.S. Appl. No. 17/937,098 12 pages.

Notice of Allowance mailed on May 29, 2025, in U.S. Appl. No. 17/819,030, 06 pages.

Singh, et al. , "Security for Online Transaction Based on User Location", In Journal of International Journal For Innovative Research In Multidisciplinary Field, vol. 3, Issue 4, Apr. 1, 2017, pp. 60-64.

Yue, et al. , "GlassDB: An Efficient Verifiable Ledger Database System Through Transparency", In repository of arXiv:2207. 00944v2, Aug. 8, 2022, 14 Pages.

* cited by examiner

Receive a request originating from a computing device to access an encrypted resource ⌐302

Access a resource policy that indicates a set of requirements for accessing the encrypted resource, the set of requirements including a static attribute requirement and a dynamic attribute requirement ⌐304

Receive a proof of an attribute from the computing device, the proof indicating that a user of the computing device possesses the attribute ⌐306

Validate the proof of the attribute based at least on information in a trusted ledger associated with the user of the device ⌐308

Determine that the validated proof satisfies the static attribute requirement ⌐310

In response to the determination that the validated proof satisfies the static attribute requirement, provide a certificate validating the dynamic attribute requirement to a decryption algorithm, the certificate including a shared secret corresponding to a dynamic attribute used by the decryption algorithm to compute a decryption key for the encrypted resource ⌐312

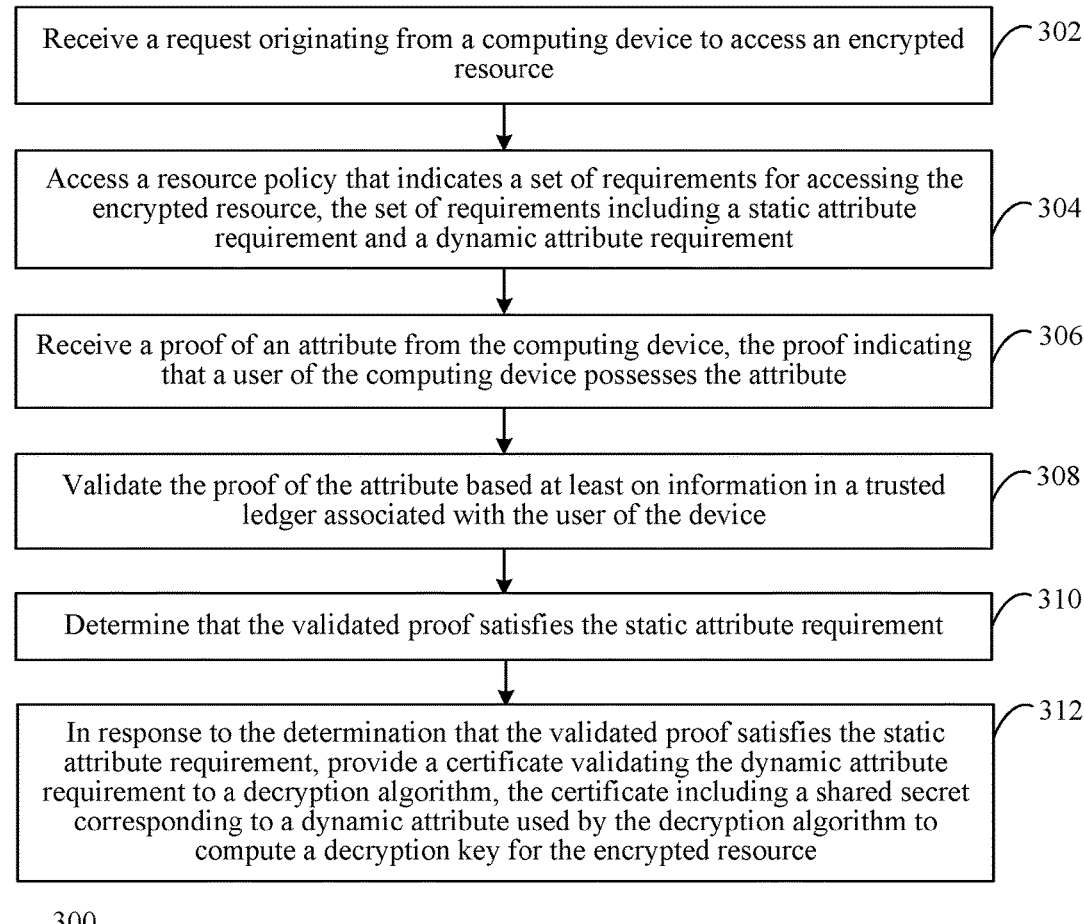

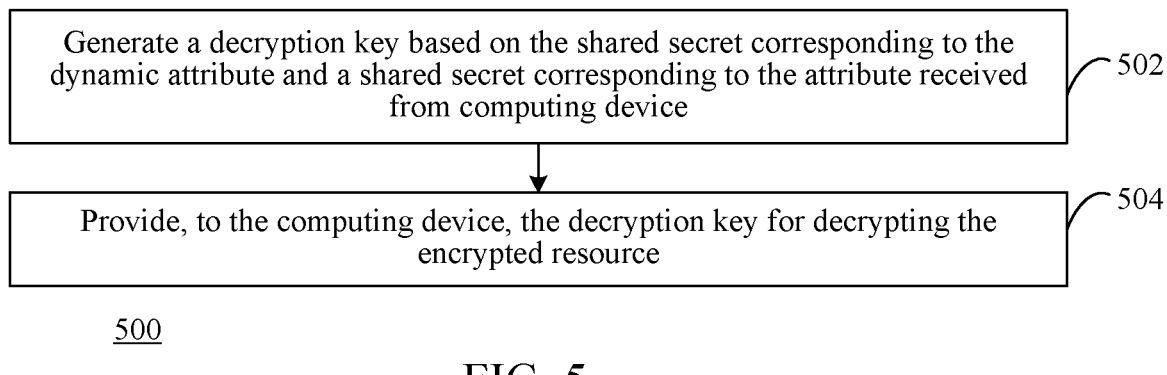

Generate a decryption key based on the shared secret corresponding to the dynamic attribute and a shared secret corresponding to the attribute received from computing device ⌐502

Provide, to the computing device, the decryption key for decrypting the encrypted resource ⌐504

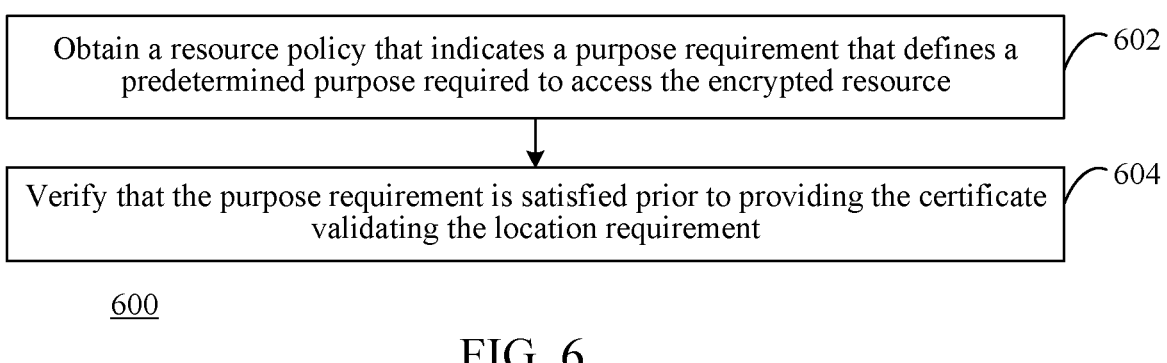

Obtain a resource policy that indicates a purpose requirement that defines a predetermined purpose required to access the encrypted resource ⌐602

Verify that the purpose requirement is satisfied prior to providing the certificate validating the location requirement ⌐604

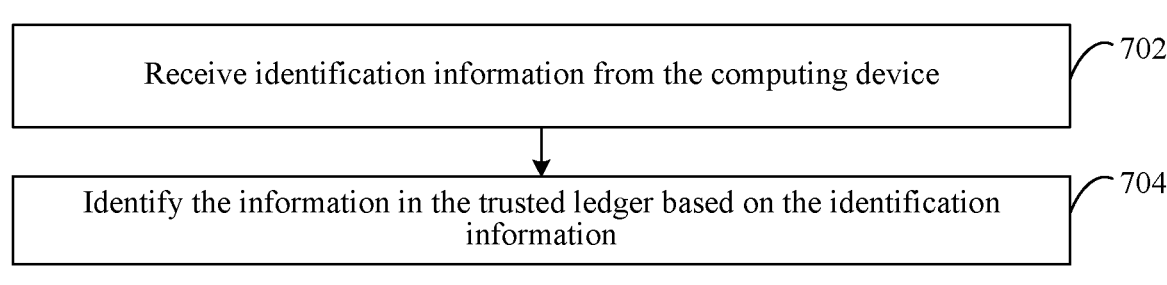

Receive identification information from the computing device ⌐702

Identify the information in the trusted ledger based on the identification information ⌐704

ACCESS CONTROL USING MEDIATED LOCATION, ATTRIBUTE, POLICY, AND PURPOSE VERIFICATION

BACKGROUND

Ensuring secure access of a resource typically involves the use of public-key cryptography (also known as asymmetric cryptography), which is a cryptographic system that uses pairs of keys. Each pair consists of a public key (which is known to others) and a private key (which is only known to the owner). Effective security requires keeping the private key private, whereas the public key can be openly distributed. While public-key cryptography mechanisms are suitable for many applications, additional security measures may be desired beyond such mechanisms for certain environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Access control systems and methods are disclosed herein for controlling access to a resource. A request is received by a location attribute policy (LAP) server to access an encrypted resource. The request is provided by a computing device, such as a user device present in a vicinity of the LAP server. The LAP server accesses a resource policy that identifies requirements for granting access to the encrypted resource, such as a list of attributes of the requestor that are required and a dynamic attribute requirement. The LAP server receives a cryptographic proof from the computing device that indicates that the requestor possesses the attributes. The LAP server validates the proof based at least on information obtained from a trusted ledger associated with the requestor. Once the proof is validated, the LAP server provides a certificate that validates the dynamic attribute requirement to a decryption algorithm. The certificate includes a shared secret that the decryption algorithm uses, in part, to generate a decryption key for the encrypted resource. The decryption algorithm also receives a shared secret from the requestor corresponding to each attribute. Based on the shared secrets received by the decryption algorithm, a decryption key is generated to decrypt the encrypted resource.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 3 shows a flowchart for controlling access to an encrypted resource in accordance with an example embodiment.

FIG. 4 depicts a block diagram of a system for generating a decryption key in accordance with a further example embodiment.

FIG. 5 shows a flowchart for providing a decryption key to a computing device to decrypt a resource in accordance with a further example embodiment.

FIG. 6 shows a flowchart for verifying a purpose requirement defined in an access policy in accordance with an example embodiment.

FIG. 7 shows a flowchart for locating information in a trusted ledger based on information received from a computing device in accordance with an example embodiment.

Figure 1:
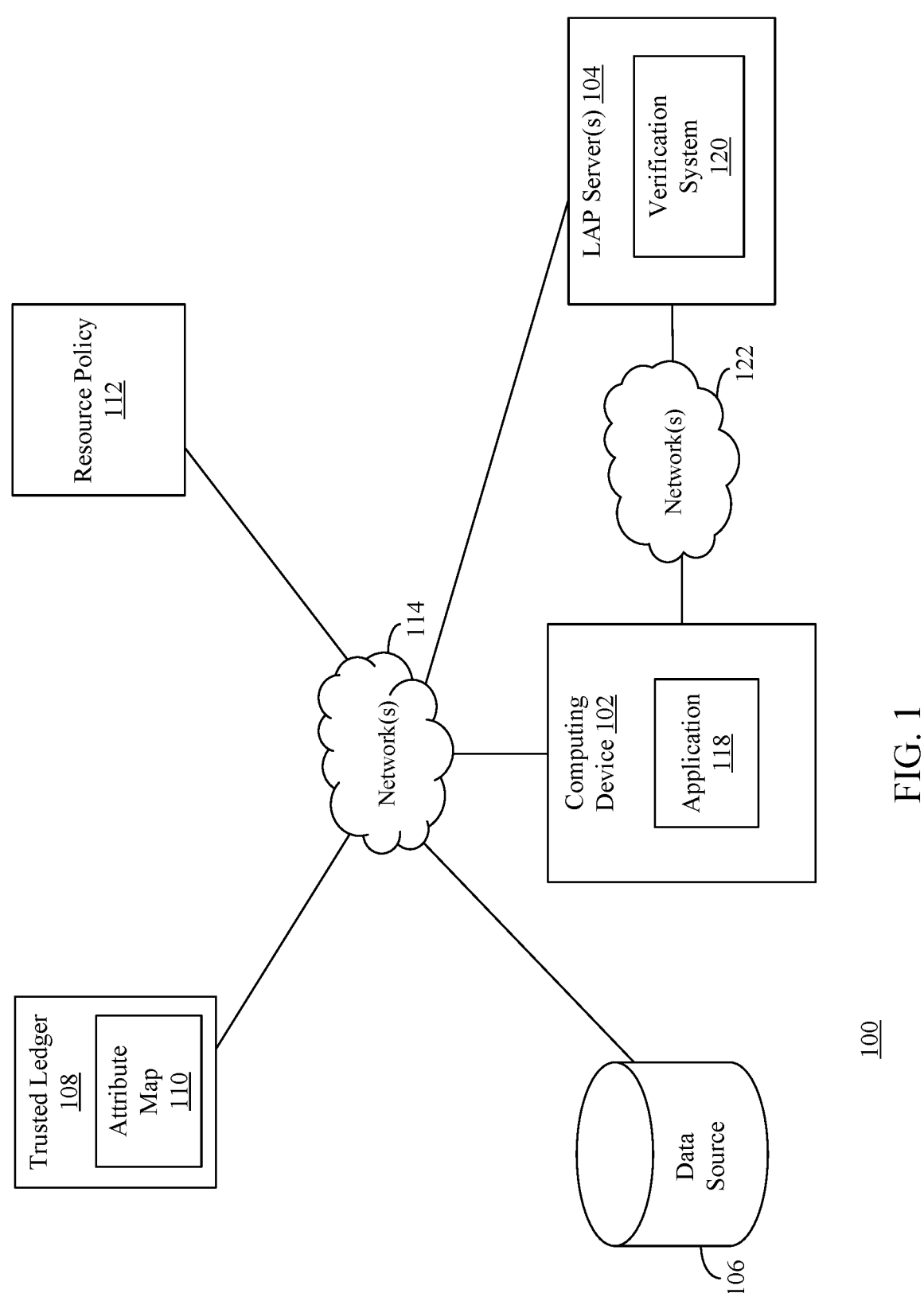
FIG. 1 shows a block diagram of an example system for controlling access to an encrypted resource in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Ensuring secure access of a resource typically involves the use of public-key cryptography (also known as asymmetric cryptography), which is a cryptographic system that uses pairs of keys. Each pair consists of a public key (which is known to others) and a private key (which is only known to the owner). Effective security requires keeping the private key private, whereas the public key can be openly distributed. While public-key cryptography mechanisms are suitable for many applications, additional security measures may be desired beyond such mechanisms for certain environments.

For example, it may be desired to restrict the access of resources based on meeting several distinct requirements that traditional cryptography mechanisms do not offer. If insufficient security measures are not maintained, potential security vulnerabilities can arise even where trusted components of an organization (e.g., components of a particular organization or network that are assumed to be secure) maintain the resources. For instance, if a malicious entity manages to infiltrate such resources, the malicious entity is free to move laterally and access or exfiltrate sensitive data. In other instances, such as where only traditional cryptography mechanisms are employed, authorized users may be provided with unfettered access to such resources, which may also increase the risk of compromising sensitive data.

Embodiments are described herein are directed to improvements in controlling access to a resource through verification of multiple requirements as defined in a resource policy. For example, a request is received by a server (e.g., a LAP server) to access an encrypted resource. The request is provided by a computing device, such as a user device present in a vicinity of the server. Upon receiving the request, the server accesses a resource policy that identifies requirements (e.g., prerequisites that should be satisfied) before access to the encrypted resource is permitted. In examples, the requirements identify as a list of attributes (e.g., a static attribute requirement) of the requestor and a dynamic attribute requirement (e.g., a location of the requestor). To verify that the requestor possesses the static attributes, the server receives a cryptographic proof from the computing device, and validates the proof based at least on information obtained by the server from a trusted ledger associated with the requestor. Once the proof is validated, the server provides a certificate that validates the dynamic attribute requirement to a decryption algorithm. The certificate includes a shared secret that the decryption algorithm uses, in part, to generate a decryption key for the encrypted resource. The decryption algorithm also receives a shared secret from the requestor corresponding to each attribute of the requestor that is required to access the resource. Based on the shared secrets received by the decryption algorithm, a decryption key is generated to decrypt the encrypted resource.

The techniques described herein provide cryptographic enforcement, in a zero-trust model (and other models), end-to-end across various types of data, services, and organizations. In particular, one or more components of the LAP server (e.g., the component(s) that perform proof verification, and/or dynamic attribute verification) may not be considered as "trusted." Such untrusted components are not entrusted to store sensitive data, such as decryption keys, due to a risk of the sensitive data being compromised thereon. Instead, such component(s) simply maintain the necessary information (e.g., code) to verify that the requestor possesses the required attributes (e.g., in a zero-knowledge fashion) and release a shared secret corresponding to the dynamic attribute requirement.

Accordingly, the techniques described herein advantageously provide improvements in other technologies, namely data encryption, security, and privacy. For instance, by utilizing a zero-trust model, access to sensitive data, such as decryption keys, is prevented. Furthermore, by imposing additional security measures (e.g., by verifying attributes of a requestor and validating a dynamic attribute requirement) before a decryption key can be generated, unfettered access to sensitive data (e.g., by authorized users) is reduced or even eliminated, thereby ensuring that access is granted only when appropriate. By doing so, the techniques described herein also prevent access to a user's network and computing entities (e.g., computing devices, virtual machines, etc.). By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

Embodiments may be implemented in various ways in various environments. For instance, FIG. 1 shows a block diagram of a system 100 for controlling access to an encrypted resource, according to an example embodiment. As shown in FIG. 1, system 100 includes a computing device 102 that includes an application 118, one or more location attribute policy (LAP) server(s) 104, a data source 106, a trusted ledger 108 that includes an attribute map 110, and a resource policy 112. In embodiments, computing device 102, LAP server(s) 104, data source 106, trusted ledger 108, and resource policy 112 are communicatively coupled via one or more networks such as network 114 and/or network 122, each of which comprising one or more of a local area network (LAN), a wide area network (WAN), an enterprise network, the Internet, etc., and includes one or more of wired and/or wireless portions. Computing device 102 is any type of processing device, including, but not limited to, a desktop computer, a server, a mobile or hand-held device (e.g., a tablet, a personal data assistant (PDA), a smart phone, a laptop, etc.), an Internet-of-Things (IoT) device, or other suitable device mentioned elsewhere herein or otherwise known. LAP server(s) 104 comprise one or more server computers and/or other types of computing devices, which may include one or more distributed or "cloud-based" servers (such as further described elsewhere herein) in embodiments.

In embodiments, LAP server(s) 104 are associated with, or are part of, a cloud-based service platform (such as further described elsewhere herein) and in some embodiments, LAP server(s) 104 comprise an on-premises server(s) (such as further described elsewhere herein) in addition to, or in lieu of, cloud-based servers. For example, LAP server(s) 104 comprise edge-based servers that have intermittent access to the cloud and are capable of performing certain verification functions as described herein during periods in which cloud access is not available. In such an example, computing device 102 communicates with LAP server(s) 104 via network(s) 122, which is different than network 114. In various embodiments, LAP server(s) comprise sovereign-like clouds (e.g., provides similar capabilities as traditional cloud-based servers, but in a different fashion). In one implementation, LAP server(s) 104 comprise secure edge devices that can operate in any suitable location or environment (e.g., a vessel). In a further implementation, LAP server(s) 104 is secured (e.g., in a tamper proof manner) against physical intrusion as well as from unintended data accesses and/or breaches. For instance, LAP server(s) 104 is configured to maintain a dynamic attribute (e.g., location) shared secret (described in greater detail herein) in a manner that it cannot be maliciously removed from the device. Rather, as described further below, such a shared secret is released when other conditions are satisfied, such as verification that a user has the requisite attributes to access a resource.

Trusted ledger 108 is configured to store information associated with one or more users of an organization, such as identity information and/or attribute information (e.g., which attributes each user of the organization possesses). In examples, information stored in trusted ledger 108 is populated by an entity associated with the organization (e.g., at a time a user is assigned to the organization, when a user logs into a computing device of the organization, etc.). As described above, in some scenarios, LAP server(s) 104 have only intermittent access to network 114, such as where LAP server(s) are present in a vessel or other vehicle where cloud access is unavailable or unreliable. In such cases, LAP server(s) 104 are configured to perform a synchronization (e.g., when cloud access is available, such as before a vessel leaves a port) such that information in trusted ledger 108 is accessed and stored locally in LAP server(s) 104. In other implementations, such as where cloud access is available, LAP server(s) 104 are configured to access information stored in trusted ledger 108 when attribute verification is to be performed in accordance with disclosed techniques.

In examples, trusted ledger 108 is configured to store information therein in a tamper-resistant manner, such as by employing blockchain techniques or other cryptographic techniques. In this manner, while information in trusted ledger 108 may be accessible to entities (e.g., information stored in trusted ledger 108 is not private), information stored therein cannot be modified by individual users. In one implementation, trusted ledger 108 comprises a Structured Query Language (SQL) ledger.

Attribute map 110 is configured to store one or more attributes for each of a plurality of users of an organization. Each of the attribute(s) for a particular user are stored in association with an identifier of that user. Examples of attribute(s) include, but are not limited to, a security clearance level of the user (e.g., confidential, secret, top secret, top secret, top secret special access etc.), a rank or a title (e.g., lieutenant, captain, major, colonel, etc.) of the user within an organization (e.g., such as a military organization), a role of the user within an organization (e.g., a field agent, an analyst, a manager, a director, a chief technology officer, a chief executive officer, etc.), a citizenship of the user, a project the user is currently a part of, etc. Attribute map 110 is also configured to store, for each attribute that each user possesses, one or more encrypted shared secrets (e.g., one or more pieces of data, such as a password, a private key, a public key, a string of characters and/or random numbers, etc. that are encoded in accordance with an encryption technique, such as, but not limited to, a secure hash algorithm (SHA)-based technique). Each of the encrypted shared secrets for a particular attribute are stored in association with the identity of that user and the attribute associated with the shared secret. As described below, the encrypted shared secret(s) are utilized to verify whether a user is actually associated with corresponding attributes. In other words, the encrypted shared secrets are used to determine which attributes a particular user possesses in accordance with example embodiments. In one example, each shared secret associated with an attribute stored in attribute map 110 is encrypted with an encryption key of the user, such as a public encryption key or a private encryption key of the user. Attribute map 110 is also configured to store, for each attribute, a public encryption key, which, as will be described below, is utilized to generate cryptographic proofs. Attribute map 110 associates each public encryption key with a corresponding attribute and corresponding encrypted shared secret of the attribute. In this manner, attribute map stores, for a given user, a set of attributes, each attribute in the set of attributes comprising an encrypted shared secret and a public key associated with the encrypted shared secret.

In examples, attributes stored in attribute map 110 comprise static attributes. Static attributes include characteristics associated with a given user that change relatively infrequently, such as a rank of a user. For example, a static attribute is an attribute that is assigned to a user (e.g., by an organization) and is unchanged until an attribute change event occurs (e.g., a promotion to a higher rank). Dynamic attributes, on the other hand, include characteristics that change more frequently than static attributes, are not assigned to a particular user (e.g., not stored in a ledger as described herein), may be modified without the user's direct intervention (are not changed "by hand" such as by the user typing at a keyboard), and/or may instead be modified by a monitoring device (e.g., a change in a user's physical location being tracked by a Global Positioning System (GPS) device). In some examples, a dynamic attribute is a characteristic that is not associated with a requesting user, such as a requirement that a resource not be accessed more than a predetermined number of times in a given time period (e.g., a resource can be accessed only once per week by any user). In example implementations, dynamic attributes of a given user are verified through one or more other techniques using LAP server(s) 104, as described below. Although embodiments are described herein in which a dynamic attribute specified by a resource policy 112 comprises a location requirement, such embodiments are not intended to be limiting. Resource policy 112 can specify any number and/or type of dynamic attributes that must be satisfied for a given resource, and LAP server(s) 104 verify that such attribute(s) are satisfied and/or provide corresponding secret shares in similar fashion as discussed herein.

Resource policy 112 is configured to store one or more policies that governs the access and use of resources (e.g., accessible pieces of data on which one or more operations can be performed) maintained by data source 106, including but not limiting policies relating to access levels, clearance levels, purpose of access, etc. Each of the polic(ies) stored in resource policy 112 specifies one or more conditions that are required to be satisfied for a user to perform a certain action with respect to a corresponding resource (e.g., viewing the contents of a resource). In examples, resource policy 112 associates each of the polic(ies) with a policy identifier (ID), which uniquely identifies a corresponding policy for a given resource. Such actions include, but are not limited to, accessing a resource (e.g., reading or writing to a resource), sending the resource to another user, sending a communication to another user, etc.). The conditions include, but are not limited to, static attributes that are required (e.g., particular attributes that a user is required to have) to perform the action, dynamic attributes that are required to be present to perform the action (e.g., a location at which the user and/or a computing device associated therewith is required to be), a purpose that the user is required to be associated with to perform the action, and/or the like. Examples of resources include, but are not limited to, a data file (e.g., a document), a database object (e.g., a table, a directory, etc.), structured data, unstructured data, semi-structured data, a data container, an application, etc. Examples of locations include, but are not limited to, a particular room or building, a particular vehicle or vessel (e.g., a particular car, a particular submarine, a particular aircraft carrier, a particular boat, etc.), a particular city, a particular country, etc.

In accordance with one or more embodiments, attribute map 110 and resource policy 112 are maintained in a respective table of a database. For example, with respect to attribute map 110, a first column of attribute map 110 stores user identities, a second column stores first attributes, a third column stores first encrypted shared secrets associated with a first attribute, a fourth column stores first public encryption keys associated with the each first attribute and/or first encrypted shared secrets, a fifth column stores second attributes, a sixth column stores encrypted shared secrets associated with a second attribute, a seventh column stores second public encryption keys associated with each second attribute and/or second encrypted shared secrets, etc. In another implementation, such as in a multi-level security (MLS) system (e.g., used in defense, manufacturing, etc.), additional granularity is provided in attribute map 110, such as information that identifies a node name or identifier, a public key corresponding to the node, an attribute list that identifies a public key corresponding to each shared secret, and an encrypted version of each shared secret (e.g., one for each attribute of the node). Techniques disclosed herein are similarly applicable to such MLS systems, or other systems as appreciated by those skilled in the relevant art. With respect to resource policy 112, a first column stores policy IDs, a second column stores the policies, etc.

In accordance with one or more embodiments, one or more columns attribute map 110 and/or resource policy 112 are maintained together in a single table of a database. An example of a database via which attribute map 110 and/or resource policy 112 are maintained includes, but is not limited to, Azure SQL Database™ from Microsoft® Corporation of Redmond, Washington.

As also shown in FIG. 1, computing device 102 comprises an application 118. Application 118 is any software application that is utilized to access a resource, encrypt a resource, and/or decrypt a resource. Examples of application 118, but are not limited to, a messaging application (e.g., Microsoft Teams™ published by Microsoft Corporation of Redmond, WA), a word processing application (e.g., Microsoft Word™ published by Microsoft Corporation), a database application, etc.

Application 118 is configured to access a resource, for example, maintained by data source 106. Data source 106 also comprises a policy ID specified for each resource maintained thereby. In accordance with an embodiment, the policy ID is stored as metadata associated with the resource. Examples of data source 106 include, but are not limited to, a data store, a file repository, a database, etc. In examples, one or more resources stored in data source 106 are encrypted (e.g., the resource is encoded in accordance with an encryption technique, such as, but not limited to, a secure hash algorithm (SHA)-based technique). In such a case, application 118 requires the resource to be decrypted (e.g., decoded in accordance with a decryption technique, such as, but not limited to, a secure hash algorithm (SHA)-based technique), for example, using a decryption key, in order to access it. The resource is decrypted if a policy (e.g., a resource access policy) associated with the resource is satisfied. As discussed herein, satisfaction of the policy can include proving that a user possesses each attribute required to access a resource and/or is physically present in a given location as required by the policy.

Verification system 120 of LAP server(s) 104 is configured to determine whether the policy for a resource attempted to be accessed by application 118 is satisfied. For example, LAP server(s) 104 determine whether the user has the necessary attributes and the dynamic attributes specified by the policy (e.g., the user is at a location specified by the policy) are satisfied. Upon determining that the policy is satisfied, LAP server(s) 104 will perform one or more actions required to generate a decryption key to decrypt the resource attempted to be accessed by application 118. In one example, LAP serve(s) 104 will provide a shared secret corresponding to a dynamic attribute requirement (e.g., a location requirement) as specified in the resource policy to a decryption algorithm. In such an example, the decryption algorithm will also receive a shared secret corresponding to each attribute that the user is required to possess to access the resource. In some embodiments, the decryption algorithm receives the shared secrets corresponding to each attribute that the user is required to possess from computing device 102. In other embodiments, the decryption algorithm receives the shared secrets corresponding to those attributes from LAP server (104). In examples, LAP server(s) 104 (or another entity not expressly illustrated) provide the decryption key to application 118, application 118 decrypts the encrypted resource using the decryption key, and application 118 accesses the decrypted resource. In accordance with another embodiment, LAP server(s) 104 decrypt the resource using the decryption key and provides the decrypted resource to application 118. In accordance with yet another embodiment, LAP server(s) 104 provide the shared secret corresponding to the dynamic attribute requirement to computing device 102, and computing device 102 generates the decryption key from the received shared secret corresponding to the dynamic attribute and one or more other shared secrets corresponding to each attribute required to access the resource.

In accordance with an embodiment, the location is verified by a LAP server of LAP server(s) 104 that is located at the location. For instance, if the location specified by the policy is an aircraft carrier, then the LAP server that performs the location verification is located on the aircraft carrier. Although, it is noted that the embodiments described herein are not so limited and that any LAP server of LAP server(s) 104 designated to perform the location verification (either located locally or remotely from the specified location) performs the location verification (or verification of any other dynamic attribute as discussed herein). Further, any number of LAP servers of LAP server(s) 104 can perform verifications of attributes, locations, and/or purposes as described herein. For instance, in an embodiment, a first LAP server can be configured to receive a cryptographic proof from computing device 102 to validate a first attribute, a second LAP server (e.g., a third party LAP server in some cases) can be configured to receive a cryptographic proof from computing device 102 to validate a second attribute, and so on.

Figure 2:
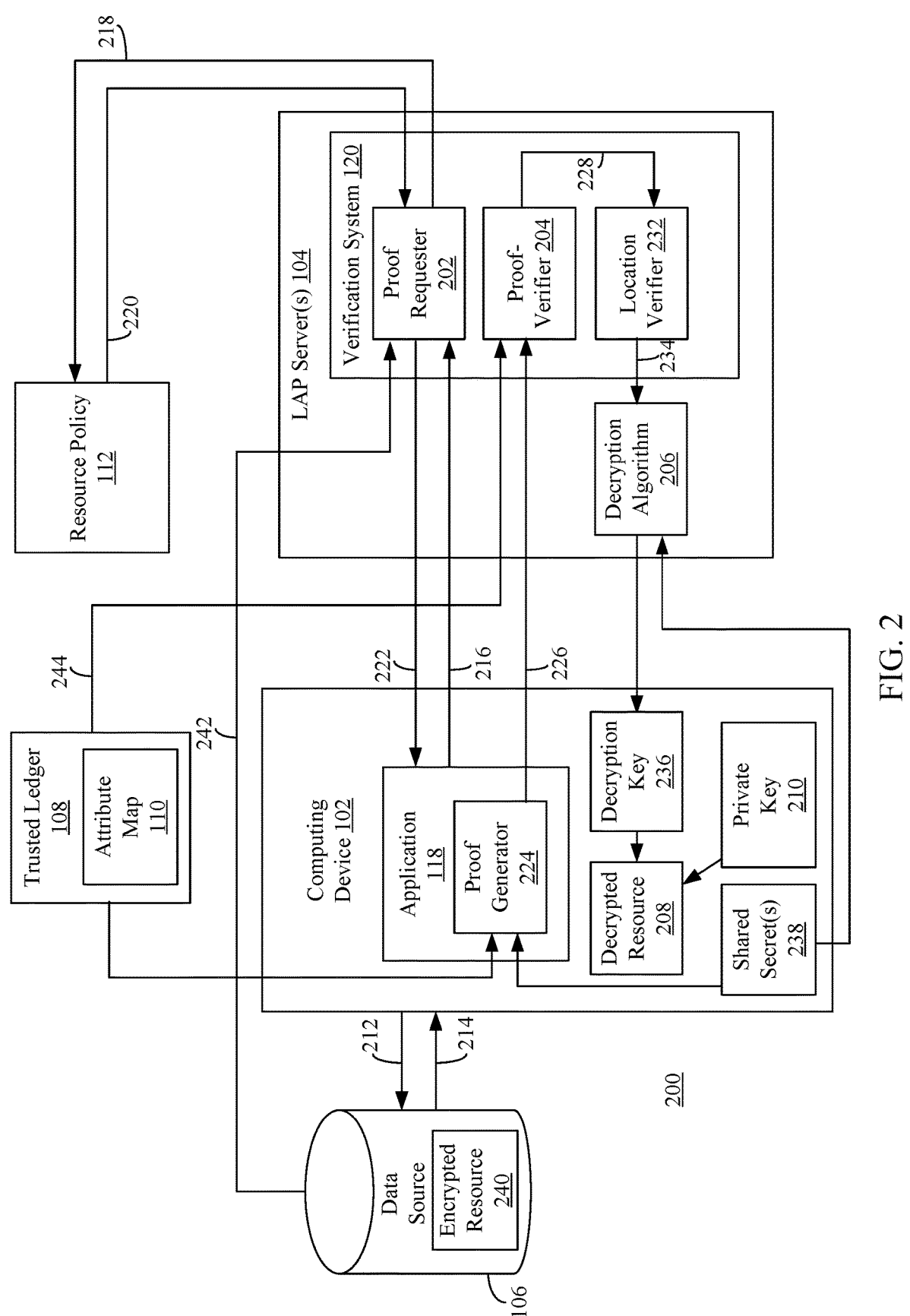
FIG. 2 shows a block diagram of an example system for controlling access to an encrypted resource in accordance with another embodiment.

FIG. 2 depicts a block diagram of a system 200 for controlling access to an encrypted resource in accordance with another embodiment. As shown in FIG. 2, system 200 includes computing device 102, LAP server(s) 104, data source 106, trusted ledger 108, and resource policy 112. As further shown in FIG. 2, LAP server(s) 104 comprise verification system 120 and a decryption algorithm 206. Verification system 120 comprises a proof requester 202, a proof-verifier 204, and a location verifier 232. Computing device 102 comprises application 118, a decrypted resource 208, a private encryption key 210, shared secret(s) 238, and a decryption key 236. Application 118 comprises a proof generator 224. Data source 106 includes an encrypted resource 240. Trusted ledger 108 includes attribute map 110. In accordance with an embodiment, each of proof requester 202, proof-verifier 204, location verifier 232, and decryption algorithm 206 are included in a single LAP server of LAP server(s) 104. In accordance with another embodiment, one or more of proof requester 202, proof-verifier 204, location verifier 232, and/or decryption algorithm 206 are included in a respective LAP server of LAP server(s) 104. In accordance with another embodiment, decryption algorithm 206 is located in another computing device, such as computing device 102 or another computing device (not shown) responsible for generating a decryption key and/or decrypting encrypted resource 240. While FIG. 2 (and other further embodiments described herein) is described as an example in which the dynamic attribute requirement comprises a location requirement, such an example is not intended to be limiting. Rather, the dynamic attribute can include other types of attributes as an alternative to, or in addition to, a location as described herein.

To request access to encrypted resource 240, application 118 provides a request 212 identifying encrypted resource 240 to data source 106. In an example, data source 106 is configured to return a response 214 including encrypted resource 240 and/or specifying at least the policy ID that identifies the resource policy associated with the requested resource and/or an organization that specifies and/or maintains the policy. In another example, data source 106 is configured to return a response 242 including encrypted resource 240 and/or specifying at least the policy ID to LAP server(s) 104.

In an example, application 118 provides the policy ID to a LAP server of LAP server(s) 104 via a request 216. In one embodiment, application 118 also provides information that indicates a location at which computing device 102 is located via a request (e.g., request 216). The information that indicates the location includes, for example, Global Positioning System (GPS) coordinates, an Internet Protocol (IP) address, a building or facility identifier, a room number, etc. In another embodiment, application 118 does not provide location information to LAP server(s) 104. Rather, LAP server(s) 104 obtains and/or determines location information using other techniques, as described below. In accordance with an embodiment, various organizations maintain respective LAP server(s), each configured to determine a policy for resources associated therewith. In accordance with an embodiment, the organization identified via response 214 and/or response 242 is a uniform resource identifier (URI) (e.g., a uniform resource locator (URL)), or an identifier utilized to lookup the URI, at which LAP server(s) of the organization and/or an attribute map and/or resource policy associated with the organization are located. In accordance with such an embodiment, response 214 and/or response 242 are provided to the LAP server(s) corresponding to the URI thereof.

Proof requester 202 of LAP server(s) 104 is configured to access a resource policy associated with encrypted resource 240 that governs the access of the resource. In examples, proof requestor 202 is configured to provide a request 218 to resource policy 112 associated with the organization that specifies the policy ID. Resource policy 112 looks up the policy associated with the received policy ID and returns the resource policy associated with encrypted resource 240 to proof requester 202 via a response 220. In examples, the resource policy indicates a set of requirements for accessing encrypted resource 240, such as one or more attributes associated with the requestor (e.g., the requesting user), and a requirement that the requestor be in a location (e.g., a predetermined location) in order to access the encrypted resource. Upon accessing the resource policy, proof requester 202 analyzes the policy to determine the attribute (s) that are required to access encrypted resource 240 requested by application 118. For instance, the resource policy specifies that the user requires a first attribute (e.g., the user is required to have a rank level of captain), a second attribute (e.g., the user is required to have a top secret security clearance level), a third attribute (e.g., the user is required to be a citizen of a particular country), and/or location information that specifies that the user must be in a particular location (e.g., aboard a particular submarine) to access the resource. These examples are only illustrative, and resource policy includes any number and/or type attributes in various embodiments.

After determining the attribute(s), proof requester 202 is configured to determine whether the user has (e.g., possesses or is associated with) the attributes specified in the resource policy. For instance, proof requester 202 provides a request 222 to application 118 to prove that the user has such attributes.

In examples, to prove that the user has the proper attributes, proof requester 202 requests application 118 to provide a cryptographic proof (e.g., a zero-knowledge proof or other cryptographic proof) that the user has the proper attributes via a request (e.g., request 222). In accordance with the cryptographic proof, the user (or application thereof (e.g., application 118)) provides a proof via a request 226 to prove to proof-verifier 204 that the user has the proper attributes while the user avoids conveying any additional information apart from the fact that the user has the proper attributes.

Request 222 is received by a proof generator 224 associated with application 118. In accordance with an embodiment, proof generator 224 is incorporated in application 118 (as shown in FIG. 2). In accordance with another embodiment, proof generator 224 is a separate component (e.g., a software application, a hardware-based proof generator, etc.) from application 118. Proof generator 224 is configured to generate a cryptographic proof (e.g., a zero-knowledge proof or other cryptographic proof) based on public encryption key(s) respectively associated with the attribute(s) and an unencrypted version of shared secrets (shown as shared secret(s) 238) respectively associated with the attributes.

As shown in FIG. 2, shared secret(s) 238 are stored locally at computing device 102. As described above, for each attribute that a user has, an encrypted version of each shared secret of shared secret(s) 238 associated with the attribute and the public encryption key associated with the attribute are stored in attribute map 110. Accordingly, proof generator 224 retrieves the public encryption key associated with each attribute from attribute map 110 in generating the cryptographic proof.

In an example embodiment, the zero-knowledge proof or other cryptographic proof for a given attribute comprises a value generated based on a shared secret of shared secret(s) 238 possessed by the requestor (e.g., stored in computing device 102) corresponding to the attribute, a public key corresponding to the attribute (e.g., a public key stored in attribute map 110 associated with the attribute and/or stored locally at computing device 102), and an encryption algorithm used to encrypt a set of data. In accordance with an embodiment, proof generator 224 generates the cryptographic proof based on a zero-knowledge protocol, such as, but not limited to, Schnorr's protocol. In examples, while proof generator 224 generates a value using shared secret(s) 238 (which are deemed private), the generated value does not include shared secret(s) 238. In other words, the generated value of the cryptographic proof cannot be used to reconstruct any shared secret of shared secret(s) 238. In this manner, proof generator 224 provides a proof that proves that the requestor possesses a given attribute, despite not relaying the shared secret corresponding to the attribute. Proof generator 224 provides the cryptographic proof to proof-verifier 204 of LAP server(s) 104 via a request 226.

In various embodiments, the zero-knowledge proof or other cryptographic proof comprises information that is used to prove that the user (e.g., of computing device 102) possesses the value of a shared secret corresponding to an attribute, and that if that shared secret is inputted into a known encryption algorithm, then the value present in the trusted ledger for the encrypted shared secret will be obtained. In various other embodiments, other algorithms are used, such as a secure hash algorithm (SHA) instead of an encryption algorithm. For instance, the zero-knowledge proof or other cryptographic proof in such a case would be used to prove that if the shared secret corresponding to the attribute is inputted into a SHA, the value stored in the trusted ledger will be obtained (provided that the value in the trusted ledger is also based on this algorithm). Other techniques are also contemplated herein, and disclosed techniques for providing a zero-knowledge proof or other cryptographic proof are not limited to these illustrative examples. In some further implementations, the zero-knowledge proof or other cryptographic proof is not re-playable. For example, in some embodiments, proof requestor 202 generates a random number for each session (e.g., each new communication session in which computing device 102 seeks access to an encrypted resource), and provides the randomly generated number to proof generator 224 to be used as part of the proof generation process. Thus, even if the same proof was attempted to be used for a subsequent session (either by the same computing device or in a malicious fashion by a different computing device), the proof would not succeed because the subsequent session would have a different randomly generated number that is to be used as part of the proof generation process.

Responsive to receiving request 226, proof-verifier 204 retrieves the public encryption key(s) associated with the attribute(s) specified by the resource policy and the encrypted shared secret(s) of the user that are associated with the attribute(s) specified by the policy from attribute map 110. Proof-verifier 204 then verifies the cryptographic proof received via request 226 based on the value generated by proof generator 224, the public encryption key(s) associated with the attribute(s) specified by the policy, and the encrypted shared secret(s) retrieved from attribute map 110. In accordance with an embodiment, proof-verifier 204 verifies the cryptographic proof based on a zero-knowledge protocol, such as, but not limited to, Schnorr's protocol. In one implementation, validation of the proof of the attribute is performed by comparing a first value generated by proof-verifier 204 that is determined from the encrypted version of the shared secret corresponding to an attribute and the public key corresponding to the attribute (both retrieved from attribute map 110) with a second value that is based on the proof of the attribute received from the computing device. In response to determining that the user possesses the attributes specified by the resource policy based on validation of one or more cryptographic proofs associated therewith, proof-verifier 204 provides a request 228 to location verifier 232 that the requestor possesses the requisite attributes. In examples, if the user does not possess the requisite attributes, proof-verifier 204 fails to validate any proof received from the user, thereby preventing the location shared secret from being released.

In response to receiving request 228, location verifier 232 determines if the location requirement specified by the resource policy associated with encrypted resource 240 is satisfied. If the location requirement is satisfied, location verifier 232 provides a certificate that includes a location shared secret 234 to decryption algorithm 206 that validates that the location requirement specified by the resource policy associated with encrypted resource 240 is satisfied. In examples, the certificate includes a shared secret (e.g., an unencrypted shared secret) corresponding to the location requirement that decryption algorithm 206 uses, at least in part, to compute a decryption key (e.g., decryption key 236) for encrypted resource 240. In an example, the shared secret corresponding to the location comprises a first portion (e.g., a first set of randomly generated numbers) of a decryption key used to decrypt encrypted resource 240. In various embodiments, in response to determining that the cryptographic proof is not valid, proof-verifier 204 does not provide request 228 to location verifier 232, thereby preventing location verifier 232 from releasing a shared secret corresponding to the location and preventing access to the contents of encrypted resource 240.

In accordance with an embodiment, the LAP server on which proof-verifier 204 executes is configured to store the shared secret corresponding to the location requirement. For instance, when an entity encrypts the resource, the entity configures the LAP server to store the shared secret corresponding to the location and specifies the conditions (e.g., the necessary attributes and/or that the user is at a predetermined location as specified in the resource policy) required to release the shared secret.

In accordance with an embodiment, location verifier 232 determines a location of computing device 102 and/or validates whether the location of the computing device satisfies the location requirement specified in the resource policy associated with encrypted resource 206. In one example, location verifier 232 compares location information provided by application 118 to the location information specified by the policy. In another example, location verifier 232 obtains or determines location information through other techniques, such as a location in which the LAP server is present (e.g., a particular vessel, a facility, a geographic location, etc.). If the location information (whether provided by computing device 102 or determined separately by LAP server) matches the location requirement set forth in the resource policy, location verifier 232 determines that the user is at a location at which access to the resource is allowed in accordance with the policy and provides (or releases) the shared secret to decryption algorithm 206.

In implementations, location verifier 232 provides the shared secret corresponding the location requirement to prevent collusion between multiple parties when a policy requires multiple attributes that no single party has, but multiple parties collude to provide.

In various embodiments, decryption algorithm 206 is configured to receive one or more shared secrets of shared secret(s) 238 that correspond to the attributes required to be possessed by the requestor as specified in the resource policy for encrypted resource 240. Each one of the shared secrets provided to decryption algorithm 206 comprises a portion of a decryption key (e.g., decryption key 236) that is used to decrypt encrypted resource 240. In an embodiment, computing device 102 provides one or more shared secrets to decryption algorithm 206 after providing a cryptographic proof that the requestor possesses the proper attributes (e.g., in response to verification of the proof by proof-verifier 204). In another embodiment, computing device 102 provides one or more shared secrets to decryption algorithm 206 before, or even concurrently with, providing the cryptographic proof to proof-verifier 204. In implementations, shared secret(s) 238 comprise unencrypted private keys, each private key corresponding to a public key of an attribute stored in attribute map 110. In some implementations, shared secrets are provided to verification system 120 (e.g., in conjunction with the cryptographic proof), and verification system 120 provides the shared secrets to decryption algorithm 206 upon verification of the cryptographic proof. In other implementations, computing device provides the shared secrets to decryption algorithm 206 (e.g., directly).

Decryption algorithm 206 is configured to generate (or recover) a decryption key 236 based on a shared secret corresponding to a location requirement and one or more shared secret(s) 238 corresponding to the attributes possessed by the requestor that are required to access the encrypted resource. In accordance with an embodiment, decryption algorithm 206 combines the shared secret corresponding to the location requirement with one or more shared secrets corresponding to the attributes possessed by the requestor to generate decryption key 236. For example, decryption algorithm 206 sums the shared secret corresponding to the location requirement with one or more shared secrets corresponding to the attributes required to be possessed by the requestor in generating decryption key 236. In another example, decryption algorithm 206 performs a polynomial evaluation with respect to these shared secrets to generate decryption key 236. It is noted that any number of portions of the decryption key are released in an embodiment and combined to generate decryption key 236. For example, a portion is released (e.g., a portion of a shared secret corresponding to the location requirement) for each proof that is verified, where a proof is received for each attribute.

In accordance with an embodiment, decryption algorithm 206 provides decryption key 236 to a decrypter that decrypts encrypted resource 240 resource to generate decrypted resource 208 for application 118. In accordance with another embodiment, decryption algorithm 206 encrypts decryption key 236 using the public encryption key of an entity (e.g., the user's device (e.g., computing device 102)), the user's application (e.g., application 118), a document management and storage system (e.g., Microsoft SharePoint™ published by Microsoft® Corp., etc.) that is to decrypt the resource. The public encryption key is retrieved from any suitable source, such as trusted ledger 108 or any other ledger or table accessible to decryption algorithm 206. In accordance with such an embodiment, decryption algorithm 206 sends the encrypted decryption key to the entity (e.g., application 118). A decrypter then decrypts the encrypted decryption key using the private encryption key (e.g., private key 210) corresponding to the public encryption key. By doing so, decryption key 236 is protected from rogue users that may intercept communications between LAP server(s) 104 and computing device 102.

While examples are described herein in which computing device 102 performs the decryption of encrypted resource 240, LAP server(s) 104 performs the description in other embodiments. For instance, in accordance with a further embodiment, LAP server(s) 104 comprise a decrypter that decrypts encrypted resource 240, and LAP server(s) 104 provide the decrypted resource to application 118. This way, application 118 is not required to perform the decryption. In yet other examples, decryption algorithm 206 is located within computing device 102 (e.g., in application 118), such that LAP server(s) 104 provides the shared secret corresponding to the location requirement to computing device 102 (e.g., upon verification of cryptographic proof as described herein), and computing device 102 generates decryption key 236 to decrypt encrypted resource 240. In yet another embodiment, decryption algorithm 206 is located in a separate computing device (not illustrated) such that generation of decryption key 236 and/or decryption of encrypted resource 240 is performed in a device separate from computing device 102 and LAP server(s) 104.

A non-limiting illustration describing the operation of system 200 will now be described. A user (e.g., a captain) logs into a server at their organization's headquarters. Upon logging in, a set of attributes (e.g., attributes A, B, and C) is assigned to the user based on the user's characteristics and/or the user's need for accessing certain resources. The server generates a shared secret and a corresponding public key associated with each attribute. The server provides at least the shared secret associated with each attribute to the user (e.g., computing device 102), which is stored as shared secret(s) 238 (e.g., $S_A$, $S_B$, and $S_C$), which are not known and/or maintained by other users. The server at the headquarters creates a row in a trusted ledger (e.g., in attribute map 110) for the user's identity with the user's attribute information, which include an encrypted version (e.g., $E(S_A)$, $E(S_B)$, and $E(S_C)$) of each private key (e.g., encrypted using a key of the user, such as a public encryption key) and a public key associated with the attribute. The ledger also stores a long term public key associated with the user identity.

At a time when a vessel (e.g., a submarine) that includes LAP server(s) 104 have cloud access, verification system 120 is configured to synchronize various types of information with the server at the headquarters used in accordance with the disclosed techniques. For instance, verification system 120 synchronizes information stored in trusted ledger 108 (including attribute map 110) and resource policy 112 prior to leaving a location (e.g., a port) where cloud access is available. In some implementations, synchronization includes receiving incremental and/or periodic updates of such information. The server at the headquarters also provides, to LAP server(s) 104 prior to leaving the location, a location shared secret ($S_{LOC}$) generated at the headquarters upon generating a decryption key for a resource. In examples, $S_A$, $S_B$, $S_C$, and $S_{LOC}$ can be combined (e.g., by decryption algorithm 206) to compute decryption key 236, as described herein. In some example embodiments, LAP server(s) located in the vessel (or any other location in which the LAP server(s) are implemented as appreciated by those skilled in the relevant art) is physically attached to the vessel (e.g., using bolts or other fasteners to prevent removal and/or modification of the hardware). After synchronizing information with the server at headquarters, the vessel may move to a location in which cloud access is no longer available with the user onboard, thereby preventing authentication of a user using other means (e.g., based on an active directory).

In an example, the user onboard the vessel requests access to an encrypted resource (e.g., encrypted resource 240, which could include ship logs, crew roster, maintenance schedules, etc. that can be decrypted with a key K D). Proof requestor 202 determines that the resource policy associated with encrypted resource indicates that attributes A, B, and C are required to access the encrypted resource, in addition to the user being present onboard the vessel. In response, proof requestor requests a cryptographic proof (e.g., a zero-knowledge proof or other cryptographic proof) from the user that proves that the user possesses attributes A, B, and C. Proof generator 224 generates the proof for each attribute and provides the proofs to proof-verifier 204, as described herein. Proof-verifier 204 validates each proof, thereby confirming that the user possesses attributes A, B, and C. In response, location verifier 232 releases the location shared secret (e.g., $S_{LOC}$) corresponding to the location requirement set forth in the access policy, which confirms that the user is onboard the vessel. The location shared secret is provided to decryption algorithm 206 responsible for generating decryption key 236 to decrypt the requested document. Decryption algorithm 206 also receives unencrypted attribute shared secrets ($S_A$, $S_B$, and $S_C$), and generates decryption key 236 that is used to generate decrypted resource 208.

In this manner, the user is provided access and use of certain files only while onboard the vessel (or in accordance with any other specified access policy for a resource). These techniques can prevent collusion attacks, such as where an entity attempts to maliciously collude with another entity to attempt to obtain a document decryption key, since the location shared secret is released only after verification of the attributes of the user. For instance, if a user that does not have the requisite attributes breaches the LAP server to obtain the location shared secret, such a secret by itself is insufficient to decrypt the encrypted resource, as the shared secrets corresponding an authorized user's attributes are still needed. Further, such techniques also prevent a malicious user from attempting to pool the attribute of another user (e.g., the malicious user does not have attribute B, and attempts to obtain rely on an attribute B from a different user), as the proof of such an attribute would fail. Accordingly, disclosed techniques provide mediated access control in a manner that requires several entities to behave in a non-malicious manner, and only after the appropriate verifications are performed can the decryption key be generated.

Further, such techniques also allow for preventing a LAP server and the individual users from possessing and/or maintaining a document decryption key. Rather, disclosed techniques allow for the computation of the decryption key upon successful verification of the appropriate information, thereby providing a fine-grained verification of location, attribute, policy, and purpose in a zero-trust model.

Accordingly, access control of an encrypted resource is provided in various ways. For example, FIG. 3 shows a flowchart 300 for controlling access to a resource, according to an example embodiment. In an embodiment, flowchart 300 is implemented by system 200 as shown in FIG. 2 and/or a system 400, as shown in FIG. 4. Accordingly, flowchart 300 will be described with reference to FIG. 2 and FIG. 4. FIG. 4 depicts a block diagram of a system 400 for generating a decryption key in accordance with an example embodiment. As shown in FIG. 4, system 400 comprises a proof-verifier 404, a decryption algorithm 406, a location verifier 432, a location shared secret 434, and an attribute shared secret 438. Proof-verifier 404, decryption generator 406, location verifier 432, location shared secret 434, and attribute shared secret 438 are examples of proof-verifier 204, decryption algorithm 206, location verifier 232, shared secret 434, and one of shared secret(s) 438 respectively described above with reference to FIG. 2. In accordance with an embodiment, each of proof-verifier 404, decryption algorithm 406, location verifier 432, location shared secret 434, and attribute shared secret 438 are implemented in a respective LAP server (e.g., LAP server(s) 104), as described above with reference to FIG. 2. In accordance with another embodiment, one or more of proof-verifier 404, decryption algorithm 406, location verifier 432, location shared secret 434, and/or attribute shared secret 438 are implemented on the same LAP server. Other structural and operational embodiments will be apparent to persons skilled in the relevant art(s) based on the following discussion regarding flowchart 300 and system 400 of FIG. 4.

Flowchart 300 begins with step 302. In step 302, a request originating from a computing device to access an encrypted resource is received. For example, with reference to FIG. 2, proof requestor 202 receives a request originating from computing device 102 (e.g., application 118) to access encrypted resource 240. In accordance with one or more embodiments, the request (e.g., request 242) is received from data source 106 upon a request by computing device 102 to access encrypted resource 240, is received directly from computing device 102 (e.g., accesses of encrypted resource 240 flow through verification system 120), or in any other manner.

In step 304, a resource policy is accessed that indicates a set of requirements for accessing the encrypted resource, the set of requirements including a static attribute requirement and a dynamic attribute requirement. For example, with reference to FIG. 2, proof requestor 202 accesses resource policy 112 to identify a resource policy associated with encrypted resource 240 via response 220. In an embodiment, the identified resource policy for encrypted resource 240 indicates a set of requirements for accessing the resource. In examples, the set of requirements include a static attribute requirement (e.g., one or more attributes that the requestor, or user of computing device 102) must possess in order to be given access to encrypted resource 240, and a dynamic attribute requirement (e.g., a requirement that specifies a location in which the requestor must be present in order to access encrypted resource 240, or other dynamic attributes as described herein). Accordingly, the identified resource policy specifies any number of constraints that must be satisfied before access to encrypted resource 240 is provided in various embodiments.

In step 306, a proof of an attribute is received from the computing device, the proof indicating that a user of the computing device possesses the attribute. For instance, with reference to FIG. 4, proof-verifier 404 receives a proof via request 426 from computing device 102 that indicates that a user of computing device 102 possesses the attribute (e.g., an attribute specified in the resource policy associated with the encrypted resource). Request 426 is an example of request 226, as described above with reference to FIG. 2. In examples, the proof comprises a cryptographic proof, such as a zero-knowledge proof or other cryptographic proof in which the requestor proves that it possesses the attribute without revealing private information (e.g., a private key) associated with the attribute.

As described above, the attribute comprises any characteristic associated with a user, including but not limited to a clearance level of the user, a rank of the user within an organization, or a role of the user within the organization. In embodiments, any number of attributes are specified in a resource policy associated with a resource, and a proof is received to verify each such attribute.

In step 308, the proof of the attribute is validated based at least on information in a trusted ledger associated with the user of the device. For instance, with reference to FIGS. 2 and 4, proof-verifier 404 validates the proof of the attribute as valid (or invalid) based at least on information (e.g., attribute map 110) in trusted ledger 108. Information received from trusted ledger 108 includes, via a request 244, attribute information for the user, such as an encrypted shared secret associated with a particular attribute of the user and a public encryption key associated with the encrypted shared secret and the particular attribute. In an example, proof-verifier 404 receives attribute information for each attribute for which a proof is provided by computing device 102.

Based at least on the information received from trusted ledger 108 (e.g., the public encryption key of the attribute and an encrypted shared secret associated with the attribute) and the proof received from computing device 102, proof-verifier 404 determines, using a zero-knowledge protocol, such as Schnorr's protocol, whether the cryptographic proof is valid. By determining that the cryptographic proof is valid, proof-verifier 404 determines that the requestor possesses the attribute for which the proof is provided, without having knowledge of the private information associated with the attribute held by the requestor.

In step 310, the validated proof is determined to satisfy the static attribute requirement. For example, with reference to FIG. 4, proof-verifier 404 determines that the validated proof is determined to satisfy the static attribute requirement specified in the resource policy associated with encrypted resource 240. In an example, proof-verifier 404 determines whether the validated proof satisfies the static attribute requirement by identifying a set of attributes in the resource policy that are required in order to permit access to encrypted resource 240. If proof-verifier 404 receives and validates a cryptographic proof for each such attribute, proof-verifier 404 determines that the static attribute requirement specified in the resource policy is satisfied.

In step 312, in response to the determination that the validated proof satisfies the static attribute requirement, a certificate is provided to a decryption algorithm that validates the dynamic attribute requirement to a decryption algorithm, where the certificate includes a shared secret corresponding to a dynamic attribute used by the decryption algorithm to compute a decryption key for the encrypted resource. For instance, with reference to FIG. 4, in response to a determination that the validated proof satisfies the static attribute requirement, proof-verifier 404 provides a request 428 to location verifier 432 to release a portion of a decryption key used to decrypt encrypted resource 240. Request 428 is an example of request 228, as described above with reference to FIG. 2. Location verifier 432 obtains and/or determines (e.g., based on GPS coordinates, predetermined information indicating the location of LAP server(s) 104, location information provided by application 118, etc.) location information 402 and provides a certificate 408 that includes a location shared secret 434 (e.g., a shared secret that corresponds to a validation of the location requirement), where location shared secret 434 is used by a decryption algorithm 406 to compute a decryption key 436. As noted, implementations are not limited to verifying location information and/or providing a certificate that includes a location shared secret. Rather, example embodiments encompass other types of dynamic attributes in addition to, or as an alternative to, a location.

As described above in some examples, the resource access policy associated with encrypted resource 240 specifies a requirement that a user (or computing device 102 associated with the user) be physically located within a proximity of a predetermined location identified in the policy at a time that the request to access the resource is received. In such examples, location verifier 432 is configured to determine whether the user (or computing device 102) is at the particular location, or within a proximity thereof (e.g., within a predetermined distance or range) at which access to the resource is allowed in accordance with the resource access policy. For example, with reference to FIG. 4, location verifier 432 compares location information 402 and the location requirement specified by the policy. If location information 402 matches the location requirement specified by the policy, location verifier 432 determines that the user is at a location at which access to the resource is allowed in accordance with the policy, thereby enabling release of location shared secret 432.

In examples, decryption algorithm 406 is also configured to receive an attribute shared secret 438 (or multiple different attribute shared secrets, if the resource policy requires several attributes possessed by the user). In embodiments, attribute shared secret 438 is provided to decryption algorithm directly by computing device 102, via LAP server(s) 104, or via other means. Upon receiving location shared secret 434 and attribute shared secret 438, decryption algorithm 406 combines the received shared secrets (e.g., by summation of the received shares or other cryptographic methods) to generate decryption key 436 for decrypting encrypted resource 240.

Decryption key 436 is an example of decryption key 236, as described above with reference to FIG. 2. Further, location shared secret 434 is an example of shared secret 234 described above with reference to FIG. 2. Still further, attribute shared secret 438 is an example of one or more of shared secret(s) 238.

In accordance with one or more embodiments, encrypted resource 240 is decrypted using the decryption key and provided to the requesting application. For example, FIG. 5 shows a flowchart 500 for providing a decryption key to a computing device to decrypt a resource in accordance with an example embodiment. In an embodiment, flowchart 500 is implemented by system 200 as shown in FIG. 2 and/or system 400 as shown in FIG. 4. Accordingly, flowchart 500 will be described with reference to FIGS. 2 and 4. Other structural and operational embodiments will be apparent to persons skilled in the relevant art(s) based on the following discussion regarding flowchart 500, system 200 of FIG. 2, and system 400 of FIG. 4.

Flowchart 500 begins with step 502. In step 502, a decryption key is generated based on the shared secret corresponding to the dynamic attribute and a shared secret corresponding to the attribute received from computing device. For instance, with reference to FIG. 4, decryption algorithm 406 receives a shared secret corresponding to a dynamic attribute (e.g., location shared secret 434 corresponding to the location) and attribute shared secret 438 corresponding to an attribute of the requestor, each of which comprise portions of a decryption key. Based at least on the received shared secrets, decryption algorithm 406 generates decryption key 436 as described above.

In step 504, the decryption key is provided to the computing device for decrypting the encrypted resource. For instance, with reference to FIGS. 2 and 4, decryption key 436 is provided to computing device 102 (e.g., application 118 or a separate decrypter component) for decrypting encrypted resource 240, thereby resulting in generation of decrypted resource 208. For example, a decrypter is configured to receive encrypted resource 240 (e.g., from application 618 or from data source 106, directly or indirectly), and perform a decryption function on the encrypted resource using decryption key 436.

In some examples, a decrypter is located on LAP server(s) 104, rather than on computing device 102. For instance, LAP server(s) 104 are provided with encrypted resource 240, and a decrypter obtains decryption key 436 to decrypt the resource. Upon decrypting the resource, decrypted resource 208 is provided to application 118.

In accordance with one or more embodiments, a purpose requirement must also be satisfied prior to allowing access to an encrypted resource. For example, FIG. 6 shows a flowchart 600 for verifying a purpose requirement defined in an access policy in accordance with an example embodiment. In an embodiment, flowchart 600 is implemented by system 200 as shown in FIG. 2 and/or system 400 as shown in FIG. 4. Accordingly, flowchart 600 will be described with reference to FIGS. 2 and 4. Other structural and operational embodiments will be apparent to persons skilled in the relevant art(s) based on the following discussion regarding flowchart 600, system 200 of FIG. 2, and system 400 of FIG. 4.

Flowchart 600 begins with step 602. In step 602, a resource policy is obtained that indicates a purpose requirement that defines a predetermined purpose required to access the encrypted resource. For instance, with reference to FIG. 4, proof-verifier 404 is configured to obtain a resource policy associated with encrypted resource 240 that indicates a purpose requirement that defines a purpose required to access encrypted resource 240. In examples, the purpose requirement specifies a particular reason (e.g., a campaign, a mission, a project, etc.) that the requestor must be associated with before access of the resource is allowed. In some examples, the purpose requirement is provided as an additional attribute that is required. In some other examples, the purpose is provided separate from the attributes required to be possessed by a requestor.

In step 604, it is verified that the purpose requirement is satisfied prior to providing the certificate validating the location requirement. For instance, with reference to FIG. 4, proof-verifier 404 is configured to verify whether the requestor has satisfied the purpose requirement prior to location verifier 432 providing certificate 408. In examples, proof-verifier 404 is configured to verify that the purpose requirement is satisfied in a similar manner as described above with respect to verifying that a requestor possesses the requisite attributes to access a resource. In an embodiment, proof-verifier 404 receives a cryptographic proof (e.g., a zero-knowledge proof or other cryptographic proof) associated with the purpose requirement from the requestor in a similar fashion, and verifies based on information contained in the trusted ledger (which also contains an encrypted shared secret corresponding to the purpose requirement and a public key corresponding to the purpose requirement in some embodiments) whether the cryptographic proof is valid. If the cryptographic proof is valid, proof-verifier 404 determines that the purpose requirement specified in the access policy is satisfied (i.e., that the user is associated with the requisite purpose). In this manner, proof-verifier 404 is configured to perform a further check (or checks, if multiple purposes or other requirements are present) prior to allowing a location shared secret to be released. For instance, once the purpose has ceased (e.g., a mission or campaign has concluded), access to the encrypted resource would no longer be allowed.

In accordance with one or more embodiments, a lookup is performed on the trusted ledger to identify an appropriate set of attributes associated with a user. For example, FIG. 7 shows a flowchart 700 for locating information in a trusted ledger based on information received from a computing device in accordance with an example embodiment. In an embodiment, flowchart 700 is implemented by system 200 as shown in FIG. 2. Accordingly, flowchart 700 will be described with reference to FIG. 2. Other structural and operational embodiments will be apparent to persons skilled in the relevant art(s) based on the following discussion regarding flowchart 700, system 200 of FIG. 2.

Flowchart 700 begins with step 702. In step 702, identification information is received from a computing device. For instance, with reference to FIG. 2, proof requestor 202 receives identification information from computing device 102 (e.g., application 118 executing therein) that identifies the computing device or a user of the computing device. For example, the identification information includes a device identifier associated with the computing device, a user identifier of the user (e.g., a username, an email address, an identification number, etc.), or other identifying information of the user or the computing device.

In step 704, information in trusted ledger is identified based on the identification information. For instance, with reference to FIG. 2, proof-verifier 204 performs a lookup in trusted leger 108 (e.g., in attribute map 110) to identify information associated with the user. In an embodiment, the lookup is based on a search of a particular column of attribute map 110 for a string that matches the identification information received from the computing device. For example, if a user "Bob" requests access to encrypted resource 240, application 118 provides information identifying the user "Bob" (e.g., as part of request 212 or as part of another request). Upon receiving the identification information, proof requestor 202 performs a lookup in attribute map 110 to identify attributes associated with the user "Bob" (e.g., an encrypted value of a shared secret for each attribute and a public key associated therewith) such that attributes required to access a given resource as specified by resource policy 112 can be validated, as described herein.

III. Example Mobile Device and Computer System Implementation

Each of computing device 102, LAP server(s) 104, data source 106, trusted ledger 108, attribute map 110, resource policy 112, application 118, verification system 120, proof requester 202, proof-verifier 204, decryption algorithm 206, location verifier 232, proof generator 224, proof-verifier 404, decryption algorithm 406, location verifier 432, and/or each of the steps of flowcharts 300, 500, 600, and/or 700 may be implemented in hardware, or hardware combined with software and/or firmware. For example, computing device 102, LAP server(s) 104, data source 106, trusted ledger 108, attribute map 110, resource policy 112, application 118, verification system 120, proof requester 202, proof-verifier 204, decryption algorithm 206, location verifier 232, proof generator 224, proof-verifier 404, decryption algorithm 406, and/or location verifier 432 (and/or any of the components thereof) and/or the steps of flowcharts 300, 500, 600, and/or 700 may be implemented as computer program code (e.g., instructions in a programming language) configured to be executed in one or more processors and stored in a computer readable storage medium. Alternatively, computing device 102, LAP server(s) 104, data source 106, trusted ledger 108, attribute map 110, resource policy 112, application 118, verification system 120, proof requester 202, proof-verifier 204, decryption algorithm 206, location verifier 232, proof generator 224, proof-verifier 404, decryption algorithm 406, and/or location verifier 432 (and/or any of the components thereof) and/or the steps of flowcharts 300, 500, 600, and/or 700 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
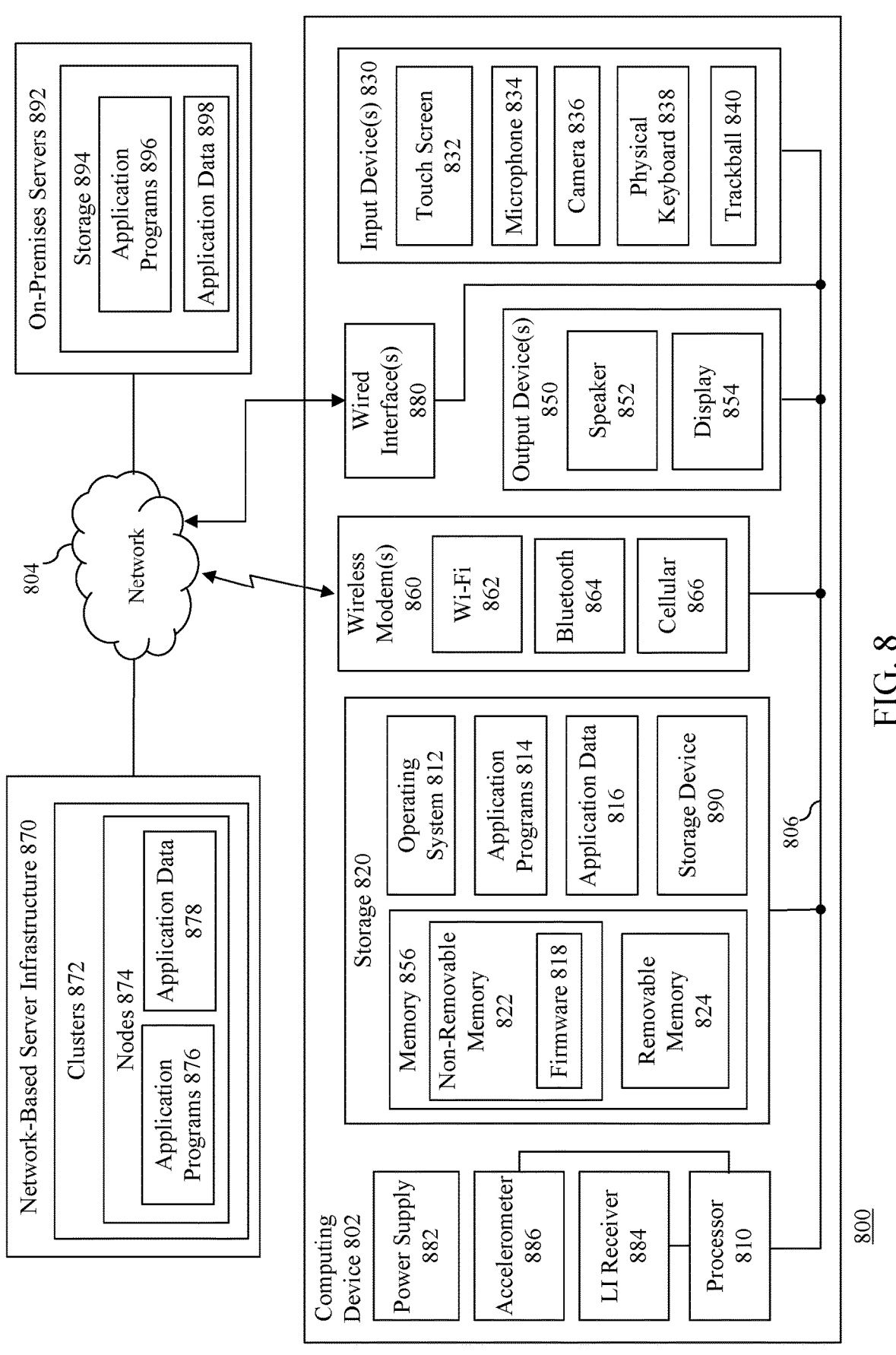
FIG. 8 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 8. FIG. 8 shows a block diagram of an exemplary computing environment 800 that includes a computing device 802, a network-based server infrastructure 870, and an on-premises servers 892. As shown in FIG. 8, computing device 802, network-based server infrastructure 870, and on-premises storage 892 are communicatively coupled via network 804. Network 804 comprises one or more networks such as local area networks (LANs), wide area networks (WANs), enterprise networks, the Internet, etc., and may include one or more wired and/or wireless portions. Network 804 may additional or alternatively include a cellular network for cellular communications.

Embodiments described herein may be implemented in one or more of computing device 802, network-based server infrastructure 870, and on-premises servers 892. For example, in some embodiments, computing device 802 may be used to implement systems, clients, or devices, or components/subcomponents thereof, disclosed elsewhere herein. In other embodiments, a combination of computing device 802, network-based server infrastructure 870, and/or on-premises servers 892 may be used to implement the systems, clients, or devices, or components/subcomponents thereof, disclosed elsewhere herein. Computing device 802, network-based server infrastructure 870, and on-premises storage 892 are described in detail as follows.

Computing device 802 can be any of a variety of types of computing devices. For example, computing device 802 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 802 may alternatively be a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 890. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and any combination of the components may be present in a particular embodiment. These components of computing device 802 are described as follows.

A single processor 810 (e.g., central processing unit (CPU), microcontroller, a microprocessor, signal processor, ASIC (application specific integrated circuit), and/or other physical hardware processor circuit) or multiple processors 810 may be present in computing device 802 for performing such tasks as program execution, signal coding, data processing, input/output processing, power control, and/or other functions. Processor 810 may be a single-core or multi-core processor, and each processor core may be single-threaded or multithreaded (to provide multiple threads of execution concurrently). Processor 810 is configured to execute program code stored in a computer readable medium, such as program code of operating system 812 and application programs 814 stored in storage 820. Operating system 812 controls the allocation and usage of the components of computing device 802 and provides support for one or more application programs 814 (also referred to as "applications" or "apps"). Application programs 814 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) that may be present to communicatively couple processor 810 to various other components of computing device 802, although in other embodiments, an alternative bus, further busses, and/or one or more individual signal lines may be present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 890, which store operating system 812, application programs 814, and application data 816 according to any distribution. Non-removable memory 822 includes one or more of RAM (random access memory), ROM (read only memory), flash memory, a hard disk (e.g., a magnetic disk drive for reading from and writing to a hard disk), and/or other physical memory device type. Non-removable memory 822 may include main memory and may be separate from or fabricated in a same integrated circuit as processor 810. As shown in FIG. 8, non-removable memory 822 stores firmware 818, which may be present to provide low-level control of hardware. Examples of firmware 818 include BIOS (Basic Input/Output System, such as on personal computers) and boot firmware (e.g., on smart phones). Removable memory 824 may be inserted into a receptacle of or otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 890 may be present that are internal and/or external to a housing of computing device 802 and may or may not be removable. Examples of storage device 890 include a hard disk drive, a solid-state drive (SSD), a thumb drive (e.g., a USB (Universal Serial Bus) flash drive), or other physical storage device.

One or more programs may be stored in storage 820. Such programs include operating system 812, one or more application programs 814, and other program modules and program data. Examples of such application programs may include, for example, computer program logic (e.g., computer program code/instructions) for implementing one or more of computing device 102, LAP server(s) 104, data source 106, trusted ledger 108, attribute map 110, resource policy 112, application 118, verification system 120, proof requester 202, proof-verifier 204, decryption algorithm 206, location verifier 232, proof generator 224, proof-verifier 404, decryption algorithm 406, and/or location verifier 432, along with any components and/or subcomponents thereof, as well as the flowcharts/flow diagrams (e.g., flowcharts 300, 500, 600, and/or 700) described herein, including portions thereof, and/or further examples described herein.

Storage 820 also stores data used and/or generated by operating system 812 and application programs 814 as application data 816. Examples of application data 816 include web pages, text, images, tables, sound files, video data, and other data, which may also be sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 802 through one or more input devices 830 and may receive information from computing device 802 through one or more output devices 850. Input device(s) 830 may include one or more of touch screen 832, microphone 834, camera 836, physical keyboard 838 and/or trackball 840 and output device(s) 850 may include one or more of speaker 852 and display 854. Each of input device(s) 830 and output device(s) 850 may be integral to computing device 802 (e.g., built into a housing of computing device 802) or external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 may display information, as well as operating as touch screen 832 by receiving user commands and/or other information (e.g., by touch, finger gestures, virtual keyboard, etc.) as a user interface. Any number of each type of input device(s) 830 and output device(s) 850 may be present, including multiple microphones 834, multiple cameras 836, multiple speakers 852, and/or multiple displays 854.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). Wireless modem 860 may also or alternatively include other radio-based modem types, such as a Bluetooth modem 864 (also referred to as a "Bluetooth device") and/or Wi-Fi 862 modem (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and may receive power from a battery internal to computing device 802, and/or from a power cord plugged into a power port of computing device 802 (e.g., a USB port, an A/C power port). LI receiver 884 may be used for location determination of computing device 802 and may include a satellite navigation receiver such as a Global Positioning System (GPS) receiver or may include other type of location determiner configured to determine location of computing device 802 based on received information (e.g., using cell tower triangulation, etc.). Accelerometer 886 may be present to determine an orientation of computing device 802.

Note that the illustrated components of computing device 802 are not required or all-inclusive, and fewer or greater numbers of components may be present as would be recognized by one skilled in the art. For example, computing device 802 may also include one or more of a gyroscope, barometer, proximity sensor, ambient light sensor, digital compass, etc. Processor 810 and memory 856 may be co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein may be stored in storage 820 and executed by processor 810.

In some embodiments, server infrastructure 870 may be present. Server infrastructure 870 may be a network-accessible server set (e.g., a cloud-based environment or platform). As shown in FIG. 8, server infrastructure 870 includes clusters 872. Each of clusters 872 may comprise a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. Any of nodes 874 may be a storage node that comprises a plurality of physical storage disks, SSDs, and/or other physical storage devices that are accessible via network 804 and are configured to store data associated with the applications and services managed by nodes 874. For example, as shown in FIG. 8, nodes 874 may store application data 878.

Each of nodes 874 may, as a compute node, comprise one or more server computers, server systems, and/or computing devices. For instance, a node 874 may include one or more of the components of computing device 802 disclosed herein. Each of nodes 874 may be configured to execute one or more software applications (or "applications") and/or services and/or manage hardware resources (e.g., processors, memory, etc.), which may be utilized by users (e.g., customers) of the network-accessible server set. For example, as shown in FIG. 8, nodes 874 may operate application programs 876. In an implementation, a node of nodes 874 may operate or comprise one or more virtual machines, with each virtual machine emulating a system architecture (e.g., an operating system), in an isolated manner, upon which applications such as application programs 876 may be executed.

In an embodiment, one or more of clusters 872 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 872 may be a datacenter in a distributed collection of datacenters. In embodiments, exemplary computing environment 800 comprises part of a cloud-based platform such as Amazon Web Services® of Amazon Web Services, Inc. or Google Cloud Platform™ of Google LLC, although these are only examples and are not intended to be limiting.

In an embodiment, computing device 802 may access application programs 876 for execution in any manner, such as by a client application and/or a browser at computing device 802. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 802 may additionally and/or alternatively synchronize copies of application programs 814 and/or application data 816 to be stored at network-based server infrastructure 870 as application programs 876 and/or application data 878. For instance, operating system 812 and/or application programs 814 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 820 at network-based server infrastructure 870.

In some embodiments, on-premises servers 892 may be present. On-premises servers 892 are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 may be shared by on-premises servers 892 between computing devices of the organization, including computing device 802 (when part of an organization) through a local network of the organization, and/or through further networks accessible to the organization (including the Internet). Furthermore, on-premises servers 892 may serve applications such as application programs 896 to the computing devices of the organization, including computing device 802. Accordingly, on-premises servers 892 may include storage 894 (which includes one or more physical storage devices such as storage disks and/or SSDs) for storage of application programs 896 and application data 898 and may include one or more processors for execution of application programs 896. Still further, computing device 802 may be configured to synchronize copies of application programs 814 and/or application data 816 for backup storage at on-premises servers 892 as application programs 896 and/or application data 898.

As used herein, the terms "computer program medium," "computer-readable medium," and "computer-readable storage medium," etc., are used to refer to physical hardware media. Examples of such physical hardware media include any hard disk, magnetic disk, optical disk, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 814) may be stored in storage 820. Such computer programs may also be received via wired interface(s) 880 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

An access control system is disclosed herein. The system includes a processor circuit; and a memory that stores program code configured to be executed by the processor circuit, the program code, when executed by the processor circuit, causes the system to: receive a request originating from a computing device to access an encrypted resource; access a resource policy that indicates a set of requirements for accessing the encrypted resource, the set of requirements including a static attribute requirement and a dynamic attribute requirement; receive a proof of an attribute from the computing device, the proof indicating that a user of the computing device possesses the attribute; validate the proof of the attribute based at least on information in a trusted ledger associated with the user of the device; determine that the validated proof satisfies the static attribute requirement; and in response to the determination that the validated proof satisfies the static attribute requirement, provide a certificate validating the dynamic attribute requirement to a decryption algorithm, the certificate including a shared secret corresponding to a dynamic attribute used by the decryption algorithm to compute a decryption key for the encrypted resource.

In one implementation of the foregoing system, the proof indicating that the user of the computing device possesses the attribute is a cryptographic proof that comprises a value generated based at least on a shared secret corresponding to the attribute, a public key corresponding to the attribute, and an encryption algorithm.

In one implementation of the foregoing system, the shared secret corresponding to the attribute cannot be reconstructed from the value in the cryptographic proof.

In one implementation of the foregoing system, the dynamic attribute requirement is a location requirement that requires that the user device be physically located within a proximity of a predetermined location at a time the request is received.

In one implementation of the foregoing system, the resource policy further indicates a purpose requirement that defines a predetermined purpose required to access the encrypted resource, and the program code further verifies that the purpose requirement is satisfied prior to providing the certificate validating the dynamic attribute requirement.

In one implementation of the foregoing system, information contained in the trusted ledger comprises a user identifier, a public key corresponding to the attribute, and an encrypted version of a shared secret corresponding to the attribute.

In one implementation of the foregoing system, the program code further validates the proof of the attribute by comparing a first value determined from the encrypted version of the shared secret and the public key corresponding to the attribute with a second value based on the proof of the attribute received from the computing device.

In one implementation of the foregoing system, the decryption algorithm further: generates a decryption key based on the shared secret corresponding to the dynamic attribute and a shared secret corresponding to the attribute received from computing device, and provides, to the computing device, the decryption key for decrypting the encrypted resource.

In one implementation of the foregoing system, the program code further: receives identification information from the computing device; and identifies the information in the trusted ledger based on the identification information.

An access control method is disclosed herein. The method includes receiving a request originating from a computing device to access an encrypted resource; accessing a resource policy that indicates a set of requirements for accessing the encrypted resource, the set of requirements including a static attribute requirement and a dynamic attribute requirement; receiving a proof of an attribute from the computing device, the proof indicating that a user of the computing device possesses the attribute; validating the proof of the attribute based at least on information in a trusted ledger associated with the user of the device; determining that the validated proof satisfies the static attribute requirement; and in response to the determination that the validated proof satisfies the static attribute requirement, providing a certificate validating the dynamic attribute requirement to a decryption algorithm, the certificate including a shared secret corresponding to a dynamic attribute used by the decryption algorithm to compute a decryption key for the encrypted resource.

In one implementation of the foregoing method, the proof indicating that the user of the computing device possesses the attribute is a cryptographic proof that comprises a value generated based at least on a shared secret corresponding to the attribute, a public key corresponding to the attribute, and an encryption algorithm.

In one implementation of the foregoing method, the shared secret corresponding to the attribute cannot be reconstructed from the value in the cryptographic proof.

In one implementation of the foregoing method, the dynamic attribute is a location requirement that requires that the user device be physically located within a proximity of a predetermined location at a time the request is received.

In one implementation of the foregoing method, the resource policy further indicates a purpose requirement that defines a predetermined purpose required to access the encrypted resource, and the method further comprises verifying that the purpose requirement is satisfied prior to providing the certificate validating the dynamic attribute requirement.

In one implementation of the foregoing method, information contained in the trusted ledger comprises a user identifier, a public key corresponding to the attribute, and an encrypted version of a shared secret corresponding to the attribute.

In one implementation of the foregoing method, the method further comprises validating the proof of the attribute by comparing a first value determined from the encrypted version of the shared secret and the public key corresponding to the attribute with a second value based on the proof of the attribute received from the computing device.

In one implementation of the foregoing method, the decryption algorithm further: generates a decryption key based on the shared secret corresponding to the dynamic attribute and a shared secret corresponding to the attribute received from computing device, and provides, to the computing device, the decryption key for decrypting the encrypted resource.

In one implementation of the foregoing method, the method further includes receiving identification information from the computing device; and identifying the information in the trusted ledger based on the identification information.

A computer-readable storage medium is disclosed herein. The computer-readable storage medium has computer program code recorded thereon that when executed by at least one processor causes the at least one processor to perform a method comprising: receiving a request originating from a computing device to access an encrypted resource; accessing a resource policy that indicates a set of requirements for accessing the encrypted resource, the set of requirements including a static attribute requirement and a dynamic attribute requirement; receiving a proof of an attribute from the computing device, the proof indicating that a user of the computing device possesses the attribute; validating the proof of the attribute based at least on information in a trusted ledger associated with the user of the device; determining that the validated proof satisfies the static attribute requirement; and in response to the determination that the validated proof satisfies the static attribute requirement, providing a certificate validating the dynamic attribute requirement to a decryption algorithm, the certificate including a shared secret corresponding to a dynamic attribute used by the decryption algorithm to compute a decryption key for the encrypted resource.

In one implementation of the foregoing computer-readable storage medium, the proof indicating that the user of the computing device possesses the attribute is a cryptographic proof that comprises a value generated based at least on a shared secret corresponding to the attribute, a public key corresponding to the attribute, and an encryption algorithm.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the claimed embodiments should not be limited by any of the above-described exemplary embodiments, but should be defined only in accordance with the following claims and their equivalents.

What is claimed is:

1. An access control system, comprising:
a processor circuit; and
a memory that stores program code configured to be executed by the processor circuit, the program code, when executed by the processor circuit, causes the system to:
receive a request originating from a computing device to access an encrypted resource;
access a resource policy that indicates a set of requirements for accessing the encrypted resource, the set of requirements including a static attribute requirement and a dynamic attribute requirement;
receive a proof of a static attribute from the computing device, the proof indicating that a user of the computing device possesses the static attribute, the static attribute being associated with a first shared secret stored on the computing device;
validate the proof of the static attribute based at least on information in a trusted ledger associated with the user of the device;
determine that the validated proof satisfies the static attribute requirement;
in response to the determination that the validated proof satisfies the static attribute requirement, provide a certificate validating the dynamic attribute requirement to a decryption algorithm, the certificate including a second shared secret corresponding to a dynamic attribute; and
provide the first shared secret to the decryption algorithm, wherein the first shared secret and the second shared secret in the certificate are used by the decryption algorithm to compute a decryption key for the encrypted resource.

2. The system of claim 1, wherein the proof indicating that the user of the computing device possesses the static attribute is a cryptographic proof that comprises a value generated based at least on the first shared secret corresponding to the static attribute, a public key corresponding to the static attribute, and an encryption algorithm.

3. The system of claim 2, wherein the first shared secret corresponding to the static attribute cannot be reconstructed from the value in the cryptographic proof.

4. The system of claim 1, wherein the dynamic attribute requirement is a location requirement that requires that the user device be physically located within a proximity of a predetermined location at a time the request is received.

5. The system of claim 1, wherein the resource policy further indicates a purpose requirement that defines a predetermined purpose required to access the encrypted resource, and
wherein the program code further verifies that the purpose requirement is satisfied prior to providing the certificate validating the dynamic attribute requirement.

6. The system of claim 1, wherein information contained in the trusted ledger comprises a user identifier, a public key corresponding to the static attribute, and an encrypted version of the first shared secret corresponding to the static attribute.

7. The system of claim 6, wherein the program code further validates the proof of the static attribute by comparing a first value determined from the encrypted version of the first shared secret and the public key corresponding to the static attribute with a second value based on the proof of the static attribute received from the computing device.

8. The system of claim 1, wherein the decryption algorithm further:
provides, to the computing device, the decryption key for decrypting the encrypted resource.

9. The system of claim 1, wherein the program code further:
receives identification information from the computing device; and
identifies the information in the trusted ledger based on the identification information.

10. An access control method, comprising:
receiving a request originating from a computing device to access an encrypted resource;
accessing a resource policy that indicates a set of requirements for accessing the encrypted resource, the set of requirements including a static attribute requirement and a dynamic attribute requirement;

receiving a proof of a static attribute from the computing device, the proof indicating that a user of the computing device possesses the static attribute, the static attribute being associated with a first shared secret stored on the computing device;

validating the proof of the static attribute based at least on information in a trusted ledger associated with the user of the device;

determining that the validated proof satisfies the static attribute requirement;

in response to the determination that the validated proof satisfies the static attribute requirement, providing a certificate validating the dynamic attribute requirement to a decryption algorithm, the certificate including a second shared secret corresponding to a dynamic attribute; and providing the first shared secret to the decryption algorithm, wherein the first shared secret and the second shared secret in the certificate are used by the decryption algorithm to compute a decryption key for the encrypted resource.

11. The method of claim 10, wherein the proof indicating that the user of the computing device possesses the static attribute is a cryptographic proof that comprises a value generated based at least on the first shared secret corresponding to the static attribute, a public key corresponding to the static attribute, and an encryption algorithm.

12. The method of claim 11, wherein the first shared secret corresponding to the static attribute cannot be reconstructed from the value in the cryptographic proof.

13. The method of claim 10, wherein the dynamic attribute requirement is a location requirement that requires that the user device be physically located within a proximity of a predetermined location at a time the request is received.

14. The method of claim 10, wherein the resource policy further indicates a purpose requirement that defines a predetermined purpose required to access the encrypted resource, and wherein the method further comprises verifying that the purpose requirement is satisfied prior to providing the certificate validating the dynamic attribute requirement.

15. The method of claim 10, wherein information contained in the trusted ledger comprises a user identifier, a public key corresponding to the static attribute, and an encrypted version of the first shared secret corresponding to the static attribute.

16. The method of claim 15, wherein the method further comprises validating the proof of the static attribute by comparing a first value determined from the encrypted version of the first shared secret and the public key corresponding to the static attribute with a second value based on the proof of the static attribute received from the computing device.

17. The method of claim 10, wherein the decryption algorithm further:

provides, to the computing device, the decryption key for decrypting the encrypted resource.

18. The method of claim 10, further comprising:

receiving identification information from the computing device; and identifying the information in the trusted ledger based on the identification information.

19. A computer-readable storage medium having computer program code recorded thereon that when executed by at least one processor causes the at least one processor to perform a method comprising:

receiving a request originating from a computing device to access an encrypted resource;

accessing a resource policy that indicates a set of requirements for accessing the encrypted resource, the set of requirements including a static attribute requirement and a dynamic attribute requirement;

receiving a proof of a static attribute from the computing device, the proof indicating that a user of the computing device possesses the static attribute, the static attribute being associated with a first shared secret stored on the computing device;

validating the proof of the static attribute based at least on information in a trusted ledger associated with the user of the device;

determining that the validated proof satisfies the static attribute requirement;

in response to the determination that the validated proof satisfies the static attribute requirement, providing a certificate validating the dynamic attribute requirement to a decryption algorithm, the certificate including a second shared secret corresponding to a dynamic attribute; and providing the first shared secret to the decryption algorithm, wherein the first shared secret and the second shared secret in the certificate are used by the decryption algorithm to compute a decryption key for the encrypted resource.

20. The computer-readable storage medium of claim 19, wherein the proof indicating that the user of the computing device possesses the static attribute is a cryptographic proof that comprises a value generated based at least on the first shared secret corresponding to the static attribute, a public key corresponding to the static attribute, and an encryption algorithm.

* * * * *